US007297953B2

(12) United States Patent
Walters

(10) Patent No.: US 7,297,953 B2
(45) Date of Patent: Nov. 20, 2007

(54) INFRARED DETECTING APPARATUS

(75) Inventor: Robert E Walters, Webster, NY (US)

(73) Assignee: Robert Bosch GmbH, Stuttgart (DE)

( * ) Notice: Subject to any disclaimer, the term of this patent is extended or adjusted under 35 U.S.C. 154(b) by 40 days.

(21) Appl. No.: 11/104,780

(22) Filed: Apr. 13, 2005

(65) Prior Publication Data

US 2006/0231763 A1 Oct. 19, 2006

(51) Int. Cl.
*G01J 5/02* (2006.01)

(52) U.S. Cl. .................. 250/353; 250/342; 250/DIG. 1

(58) Field of Classification Search ................ 250/353, 250/342, DIG. 1

See application file for complete search history.

(56) References Cited

U.S. PATENT DOCUMENTS 3,875,408 A 4/1975 Pusch ......................... 250/339
4,001,586 A 1/1977 Fraioli ......................... 250/345
4,734,585 A * 3/1988 Owers ......................... 250/353
4,868,391 A * 9/1989 Messiou ..................... 250/353
4,893,014 A 1/1990 Geck .......................... 250/353
5,418,368 A 5/1995 Sandell et al. .............. 250/353
5,452,135 A 9/1995 Maki et al. ................. 359/834
5,453,622 A 9/1995 Sandell et al. .............. 250/353
6,348,691 B1 * 2/2002 Sandell et al. .............. 250/353
2004/0129885 A1 7/2004 McKenney ................. 250/353

* cited by examiner

*Primary Examiner*—David Porta
*Assistant Examiner*—Mindy Vu
(74) *Attorney, Agent, or Firm*—Baker & Daniels LLP

(57) ABSTRACT

An infrared detecting apparatus includes at least one infrared-sensitive element. Focusing means focuses infrared energy from a first zone onto the at least one infrared-sensitive element. An opaque element including a throughhole is positioned such that infrared energy may pass through the throughhole from a second zone to the at least one infrared-sensitive element. The second zone is closer than the first zone to the at least one infrared-sensitive element.

40 Claims, 11 Drawing Sheets

*Fig. 3b*
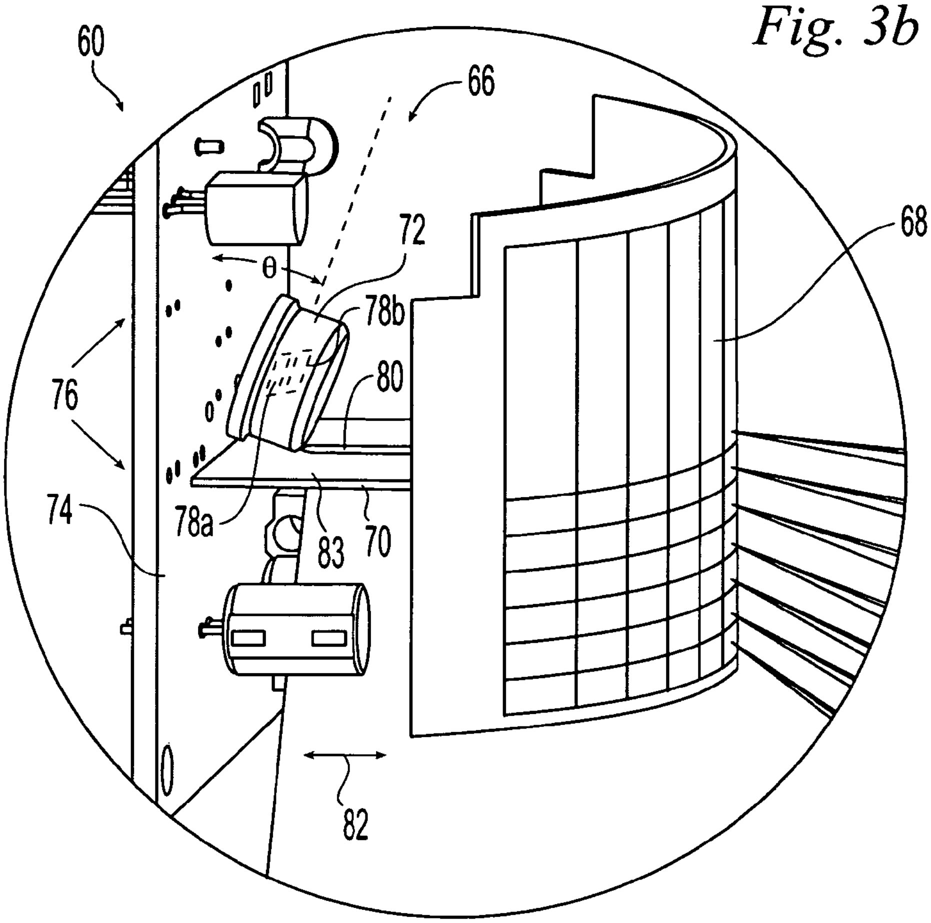
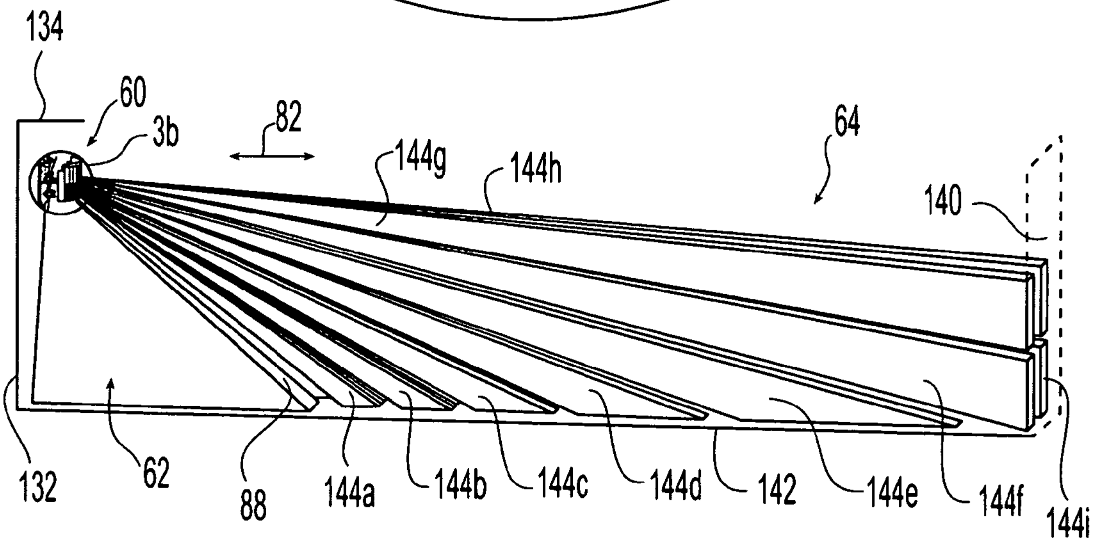
*Fig. 3a*

*Fig. 5b*
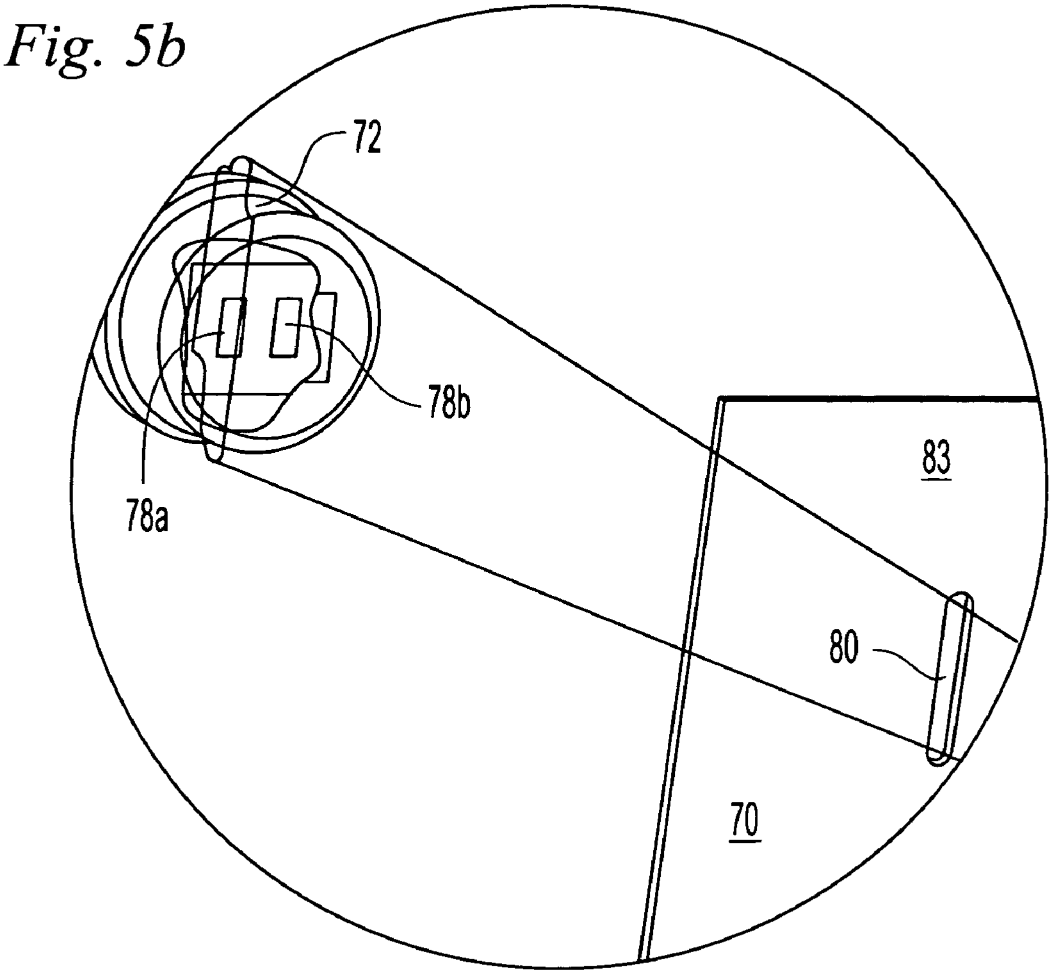
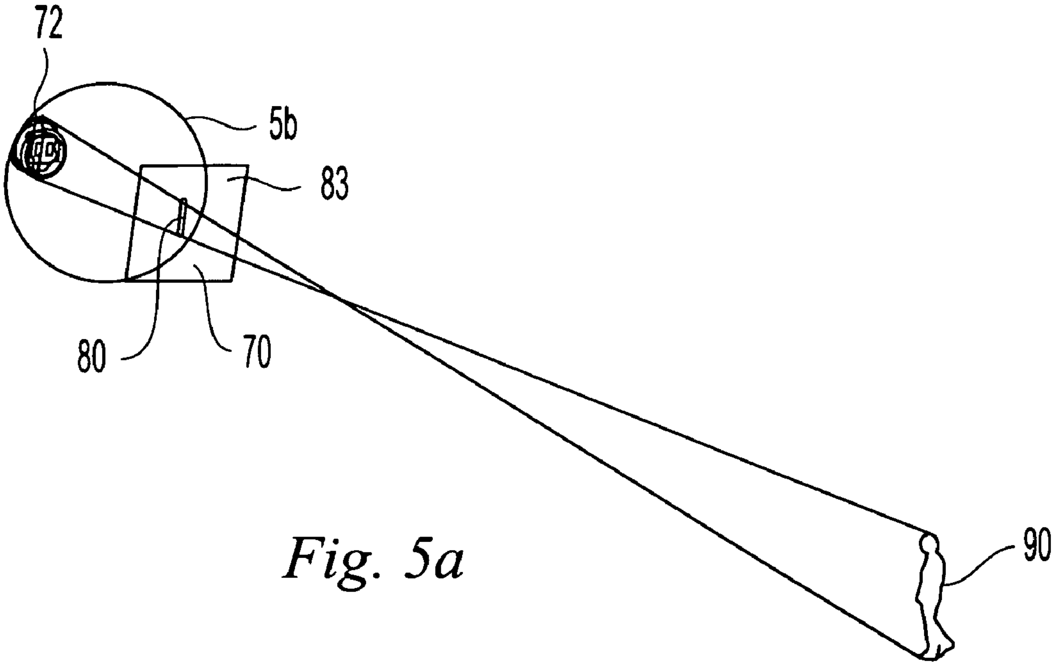
*Fig. 5a*

*Fig. 11b*
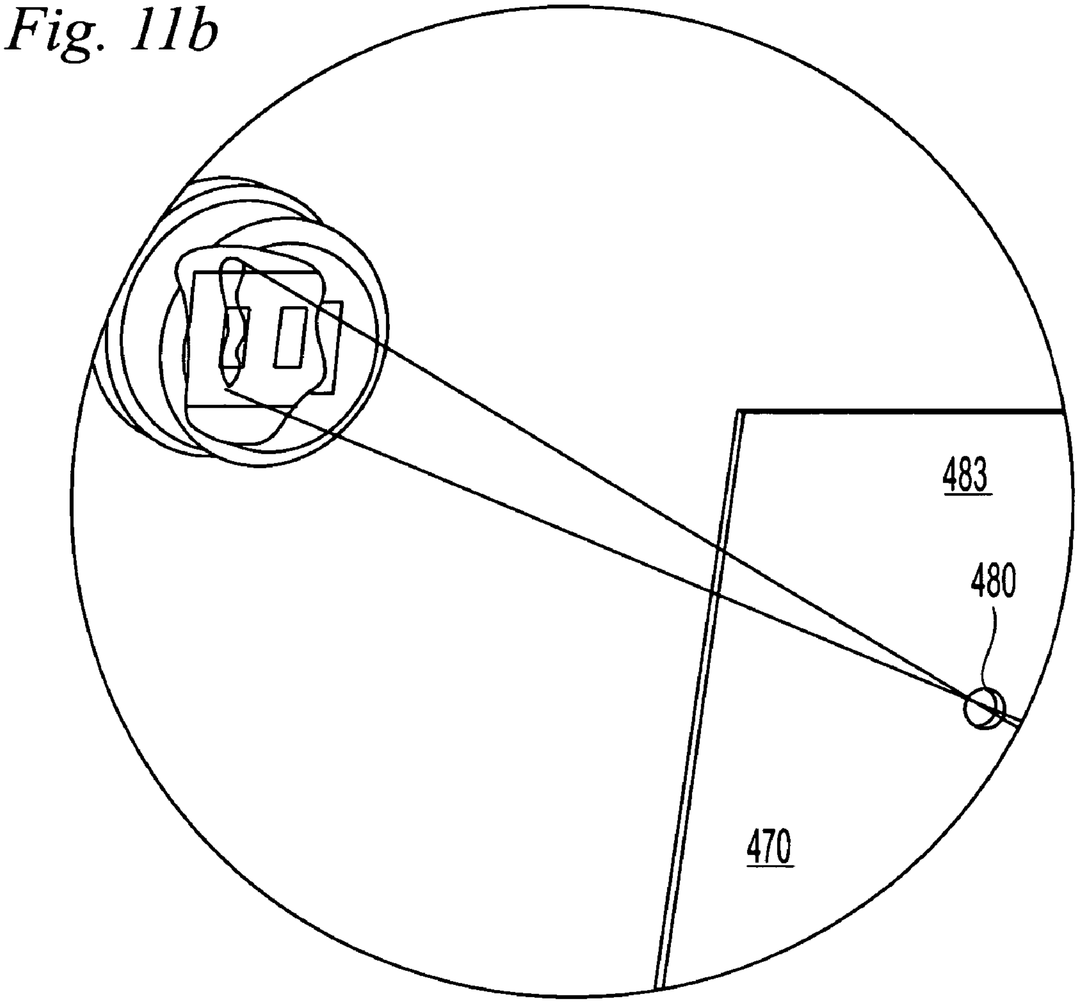
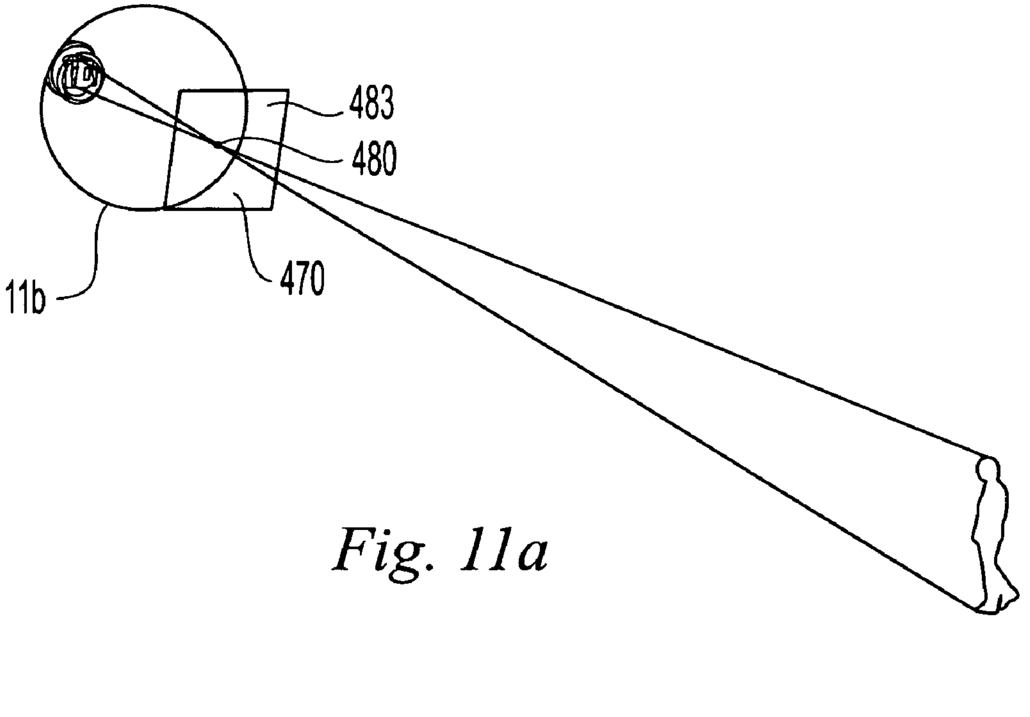
*Fig. 11a*

INFRARED DETECTING APPARATUS

BACKGROUND OF THE INVENTION

1. Field of the Invention

The present invention relates to surveillance systems, and, more particularly, to surveillance systems for detecting an intrusion into a monitored area of space.

2. Description of the Related Art

Surveillance systems including motion detectors are known for detecting intrusions of a moving object, such as a human, into a monitored zone of space. The motion detectors typically include infrared detectors that sense the presence of a source of infrared radiation, e.g., a warm body, anywhere along the line of sight of the infrared sensors. FIG. 1*a* illustrates a typical motion detector 30 mounted on a wall 32 or a ceiling 34. Motion detector 30 monitors a zone 36 within a room by imaging multiple areas of the room onto an infrared sensor 38 shown in the enlarged view of FIG. 1*b*. The output of detector 30 is then amplified and processed for alarm output from the motion detector. Thus, the monitored zone 36 generally includes at least a majority of the space between motion detector 30 and some barrier, such as a wall 40 or a floor 42, that blocks infrared radiation.

The monitored space or zone is typically divided into a plurality of subzones, such as the illustrated subzones 44*a-i*, and the detector may detect movement from one of the subzones to another. Only the subzones extending through a central portion of the room are shown in FIGS. 1*a* and 1*b* for clarity of illustration. A single fresnel lens array 46 may be used to focus subzones 44 onto sensor 38. Although most of the space in the room may be monitored by this arrangement, a zone 48 may remain unprotected due to limits on the size of fresnel lens array 46. Thus, an intruder may be able to pass through the room undetected by walking through only unprotected zone 48.

It is possible to add another fresnel lens 50 (FIG. 2*b*) for looking downward from the sensor. However, as illustrated in FIG. 2*a*, unprotected zones 52 still remain which allow a skilled intruder to pass through the room undetected.

What is needed in the art is an inexpensive intrusion detection system that can monitor the length of a room, including the space below the detector, to prevent an intruder from passing through the room undetected.

SUMMARY OF THE INVENTION

The present invention provides an inexpensive infrared detecting apparatus that monitors zones that form a protected "curtain" area that images the room from the floor up and from one end of the room to the other. Thus, an intruder cannot pass through the room without going through the monitored curtain area.

The invention comprises, in one form thereof, an infrared detecting apparatus including at least one infrared-sensitive element. Focusing means focuses infrared energy from a first zone onto at least one infrared-sensitive element. An opaque element including a throughhole is positioned such that infrared energy may pass through the throughhole from a second zone to the at least one infrared-sensitive element. The second zone is closer than the first zone to the at least one infrared-sensitive element.

In another form, the invention comprises an infrared detecting apparatus including at least one infrared-sensitive element. A fresnel lens array is positioned to focus infrared energy from a first zone onto the at least one infrared-sensitive element. An infrared energy conduit carrier infrared energy from a second zone to the at least one infrared-sensitive element. The first zone extends farther than the second zone from the at least one infrared-sensitive element.

In yet another form, the invention comprises an infrared detecting apparatus including at least one infrared-sensitive element. A fresnel lens array is positioned to focus infrared energy from a first zone onto the at least one infrared-sensitive element. An opaque element includes a throughslot defining a longitudinal direction. The opaque element is positioned such that infrared energy may pass through the throughslot from a second zone to the at least one infrared-sensitive element. The first zone extends farther than the second zone from the at least one infrared-sensitive element in the longitudinal direction.

An advantage of the present invention is that the entire length of a room can be monitored to thereby prevent an intruder from passing through the room undetected.

Another advantage is that the throughholes or throughslots used to focus the infrared energy are simple and can be provided inexpensively.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 3*a* is a perspective view of one embodiment of an infrared detecting apparatus of the present invention monitoring two separate zones within a room;

FIG. 3*b* is an enlarged view of area 3*b* of FIG. 3*a;*

FIG. 5*a* is a perspective view illustrating the interaction of the opaque element and infrared sensor of FIG. 3*b;*

FIG. 5*b* is an enlarged view of area 5*b* of FIG. 5*a;*

FIG. 11*a* is a perspective view of another embodiment of an opaque element being used to image a person onto an infrared sensor according to the present invention; and FIG. 11*b* is an enlarged view of area 11*b* of FIG. 11*a*.

Figure 1B:
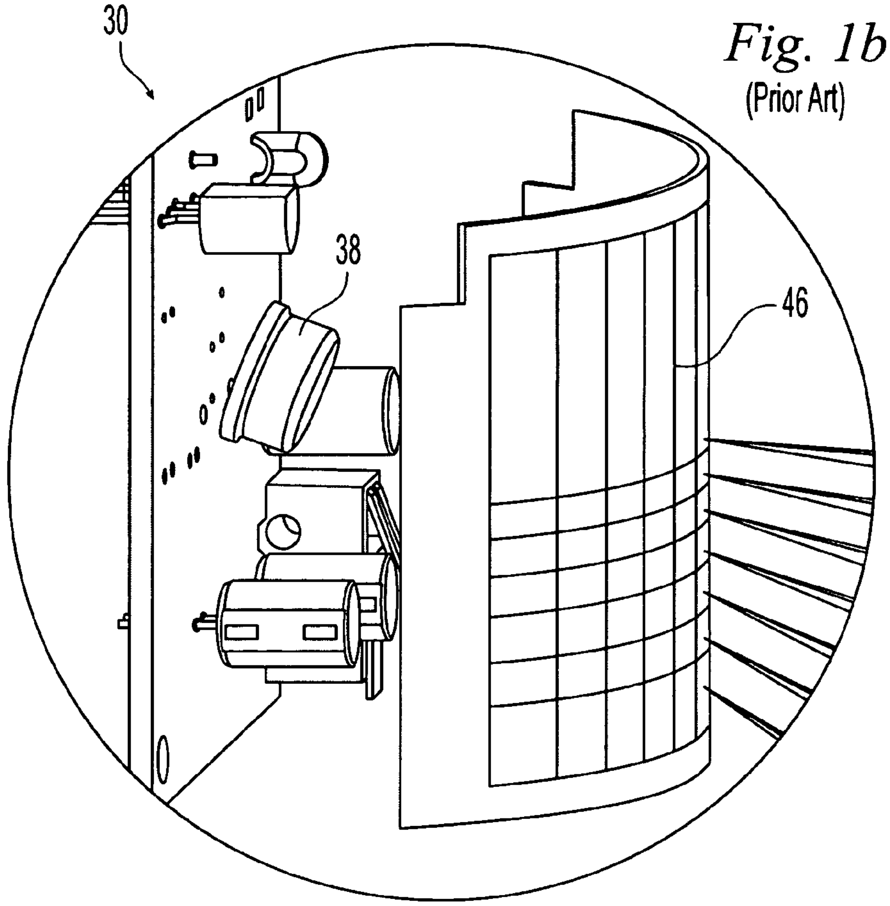
Fig. 1b (Prior Art)
FIG. 1*b* is an enlarged view of area 1*b* of FIG. 1*a;*
Figure 1A:
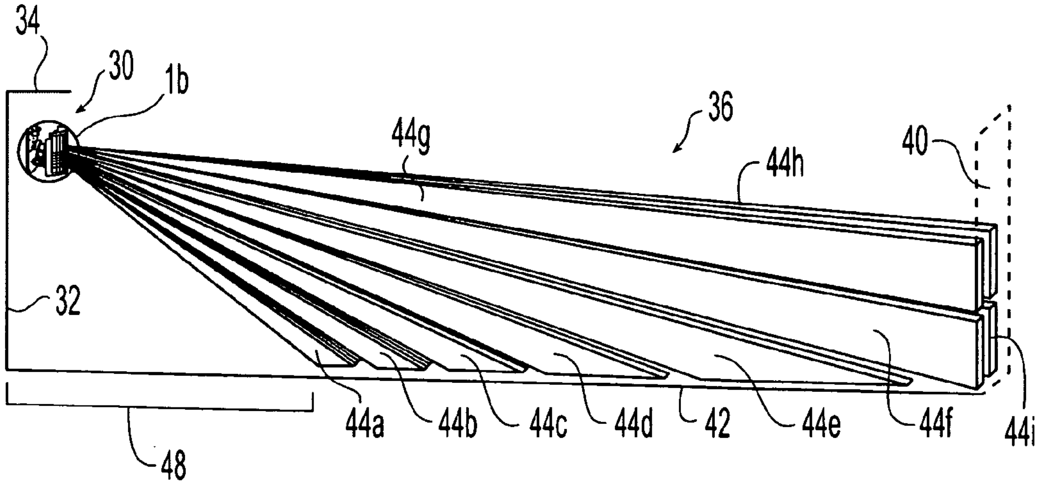
Fig. 1a (Prior Art)
FIG. 1*a* is a perspective view of a known infrared detecting apparatus monitoring a zone within a room.
Figure 2B:
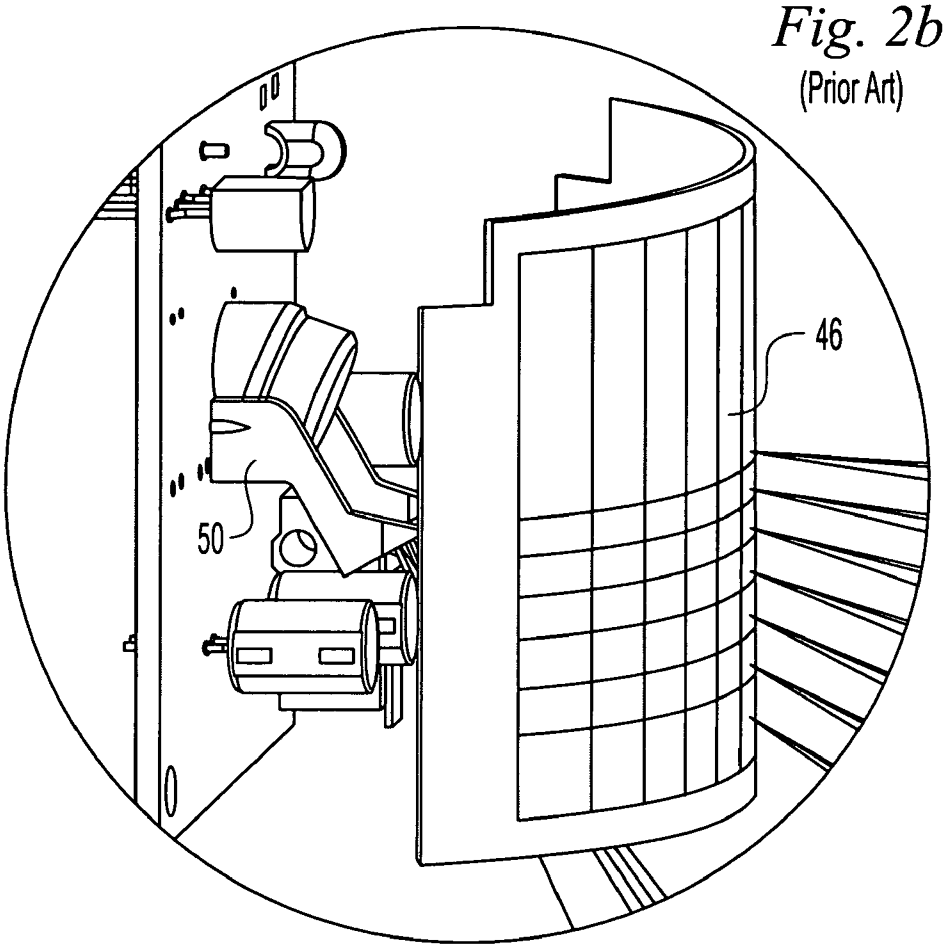
Fig. 2b (Prior Art)
FIG. 2*b* is an enlarged view of area 2*b* of FIG. 2*a;*
Figure 2A:
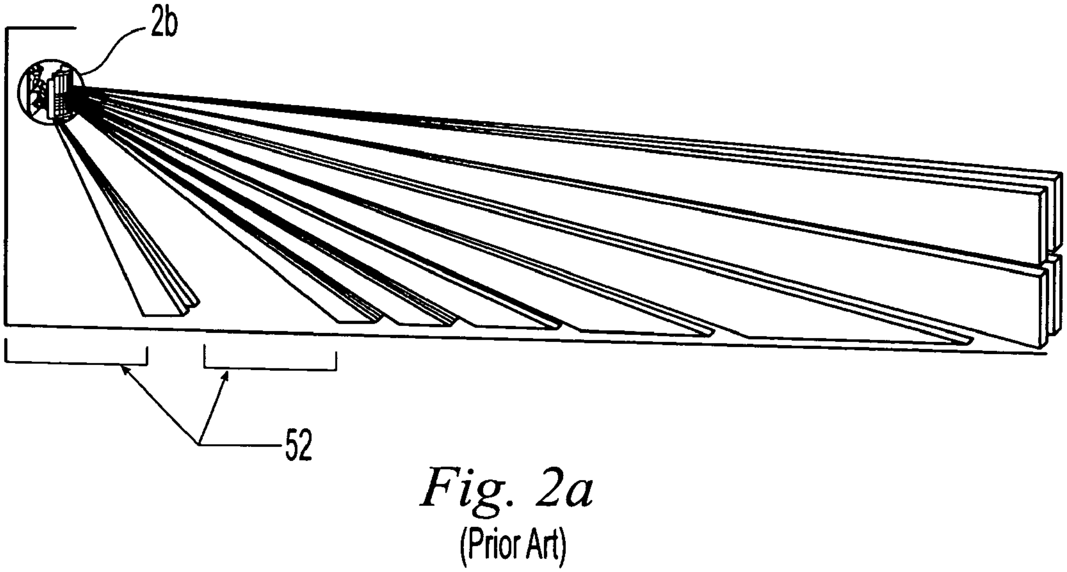
Fig. 2a (Prior Art)
FIG. 2*a* is a perspective view of another known infrared detecting apparatus monitoring two separate zones within a room.

Corresponding reference characters indicate corresponding parts throughout the several views. Although the exemplifications set out herein illustrate the invention, in one form, the embodiments disclosed below are not intended to be exhaustive or to be construed as limiting the scope of the invention to the precise form disclosed.

DESCRIPTION OF THE PRESENT INVENTION

Referring to FIG. 3*a*, there is shown one embodiment of an infrared detecting apparatus 60 of the present invention monitoring a near space or zone 62 and a far space or zone 64. Apparatus 60 includes an electrical signal processing circuit 66 (FIG. 3*b*), a fresnel lens array 68 and an infrared energy conduit in the form of an opaque element 70. Apparatus 60 may be mounted on a wall 132 and/or a ceiling 134. In one embodiment, apparatus 60 is mounted approximately 9.5 feet above a floor 142.

Circuit 66 includes an infrared (IR) sensor 72 mounted on a circuit board 74 along with various electronic components 76. IR sensor 72 may be downwardly tilted at an angle θ relative to a vertically oriented board 74. In one embodiment, angle θ is approximately between 20° and 30°.

IR sensor 72 may include two side-by-side rectangular infrared-sensitive elements 78*a*, 78*b*, each capable of producing a respective electrical signal dependent upon an amount of IR energy that impinges upon the element 78. Infrared-sensitive elements 78*a*, 78*b* may be oppositely polarized, and their outputs may be summed together. Because of the opposite polarity, changes in the background temperature may have no net effect on the sum of the outputs of infrared-sensitive elements 78*a*, 78*b*, and thus may be correctly ignored. Electronic components 76 may amplify and process the outputs of infrared-sensitive elements 78*a*, 78*b* for generating an alarm output signal dependent upon the outputs of infrared-sensitive elements 78*a*, 78*b*.

Fresnel lens array 68 may be of conventional construction for focusing infrared energy from far zone 64 onto infrared-sensitive elements 78*a*, 78*b*. However, another type of focusing means may be employed, such as one or more mirrors which may be curvilinearly-shaped.

Near zone 62 is generally closer than far zone 64 to infrared-sensitive elements 78*a*, 78*b*. Moreover, far zone 64, despite being limited by wall 140 and/or floor 142, may extend farther than near zone 62 from infrared-sensitive elements 78*a*, 78*b* in a longitudinal direction 82.

Far zone 64 may be divided into a plurality of subzones, such as the illustrated subzones 144*a-i*, and apparatus 60 may detect movement of a warm body from one of the subzones to another. Only the subzones extending through a central portion of the room are shown in FIG. 3*a* for clarity of illustration. A single fresnel lens array 68 may be used to focus subzones 144 onto infrared-sensitive elements 78*a*, 78*b*.

Opaque element 70 may be in the form of an opaque substrate 83 including a throughhole 80 having a width approximately between 0.03 inch and 0.12 inch. Opaque element 70 may be positioned such that infrared energy may pass through throughhole 80 from near zone 62 to infrared-sensitive elements 78*a*, 78*b*. In one embodiment, substrate 83 holds or supports IR sensor 72 at angle θ relative to the vertical direction.

Figure 4:
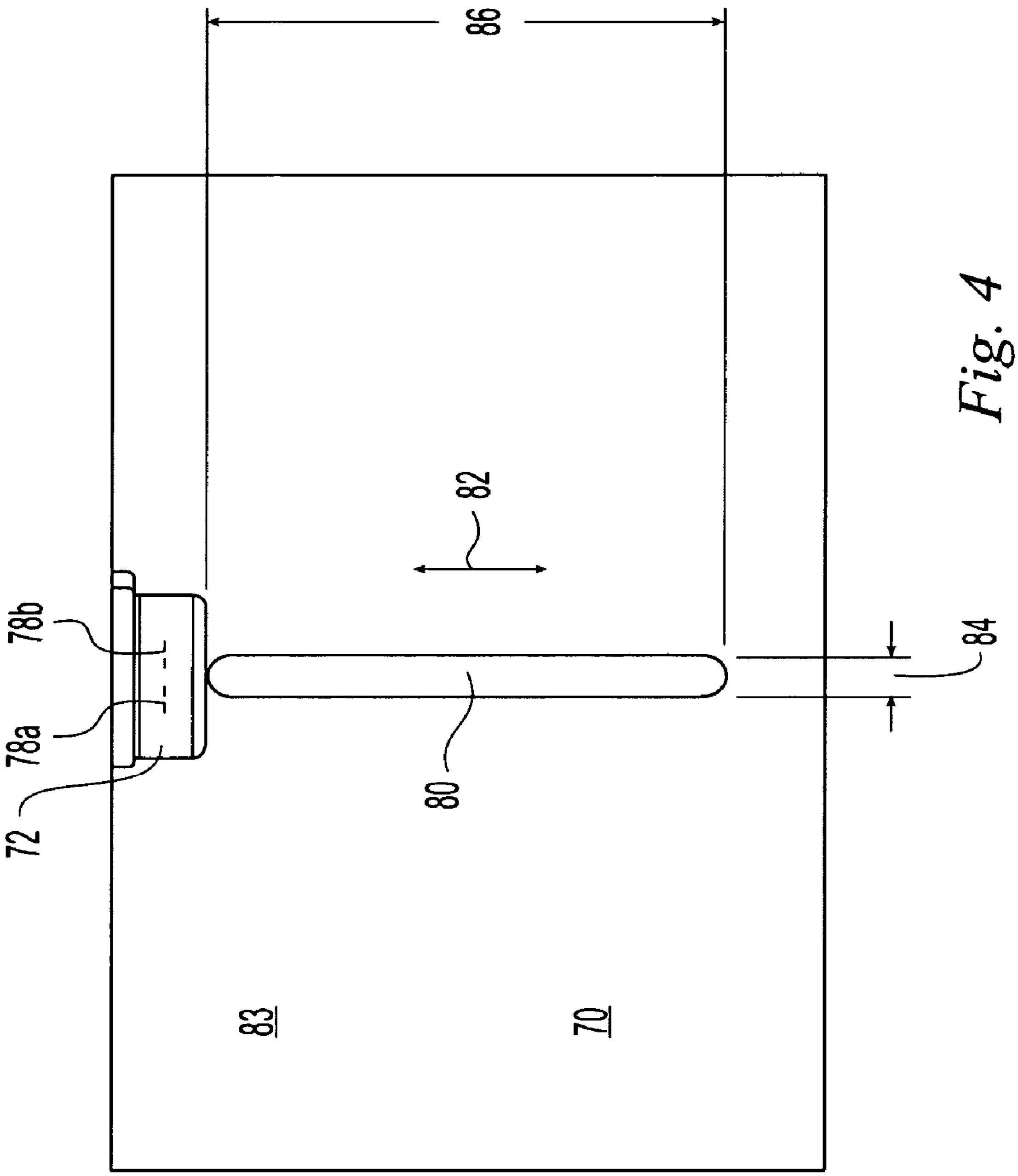
FIG. 4 is an overhead view of the opaque element and infrared sensor of FIG. 3*b;*

In the embodiment of FIG. 3*b*, throughhole 80 is in the form of an elongate throughslot defining longitudinal directions indicated by double arrow 82. Throughslot 80 has a width 84 defined as shown in FIG. 4, and a length 86. Width 84 may be approximately between 0.03 inch and 0.12 inch, and length 86 may be approximately between 0.25 inch and 3.0 inches. In one embodiment, width 84 is approximately 0.08 inch and length 86 is approximately 1.0 inch. Advantageously, the relatively small width 84 may provide an infinite depth of field. Moreover, the relatively small width 84 may provide images on infrared-sensitive elements 78*a*, 78*b* that have low levels of distortion. IR sensor 72 is shown in FIG. 4 as being oriented perpendicular to substrate 83 for ease of illustration. However, it is to be understood that IR sensor 72 may be tilted relative to substrate 83 as shown in FIG. 3*b*.

Throughslot 80 may be provided with a length such that a far edge 88 of near zone 62 is closely adjacent first subzone 144*a* of far zone 64. Thus, near zone 62 and far zone 64 may conjointly form a "curtain" area that images the room from floor 142 and between walls 132, 140.

As best seen in FIGS. 5*a*, 5*b*, infrared-sensitive elements 78*a*, 78*b* may be generally rectangularly-shaped and generally vertically oriented, i.e., more particularly, infrared-sensitive elements 78*a*, 78*b* may be downwardly tilted at a maximum of about 30° from vertical. The generally vertical orientation of infrared-sensitive elements 78*a*, 78*b* may advantageously increase the amount of infrared energy captured from a person 90 walking upright. Thus, the rectangular shape and generally vertical orientation of infrared-sensitive elements 78*a*, 78*b* may increase the sensitivity of elements 78 to an image moving horizontally past apparatus 60. As such, image distortion in the vertical direction has little effect on the sensitivity of IR sensor 72. In one embodiment, each of infrared-sensitive elements 78*a*, 78*b* has a width of one millimeter and a height of two millimeters. Substrate 83 is shown in FIGS. 5*a* and 5*b* as being oriented substantially parallel to elements 78*a*, 78*b* for ease of illustration. However, it is to be understood that there may be an angle of approximately 65° between substrate 83 and elements 78*a*, 78*b* as shown in FIG. 3*b*.

Figure 6B:
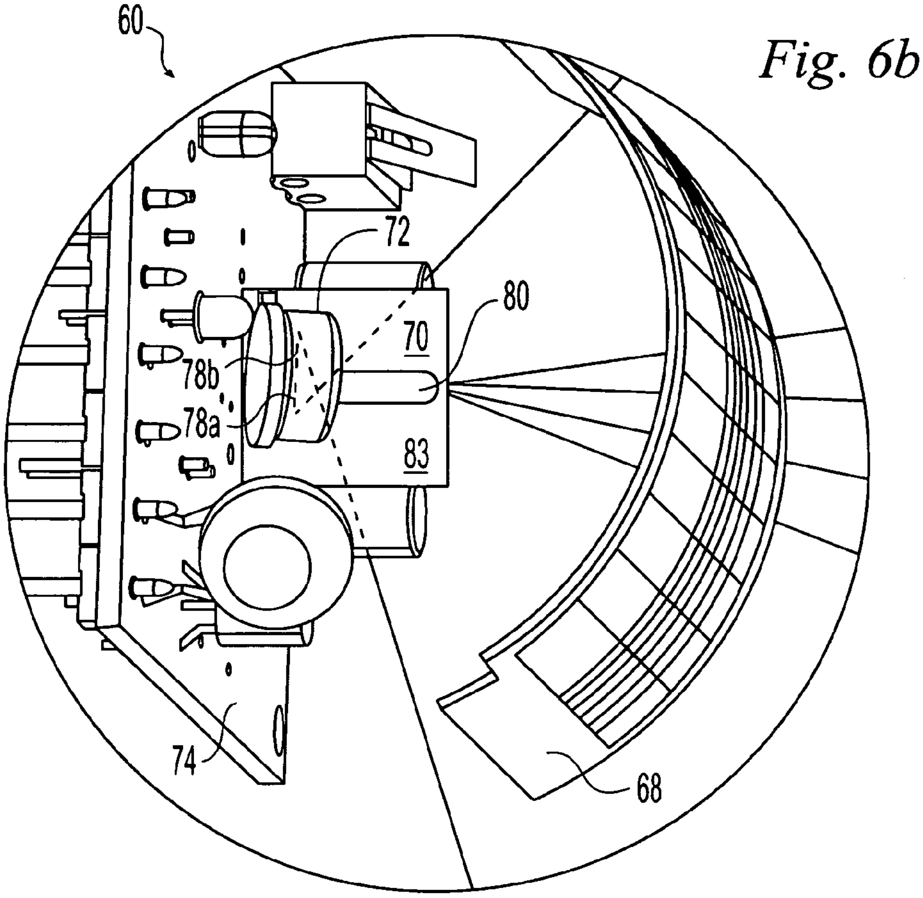
FIG. 6*b* is an enlarged view of area 6*b* of FIG. 6*a;*
Figure 6A:
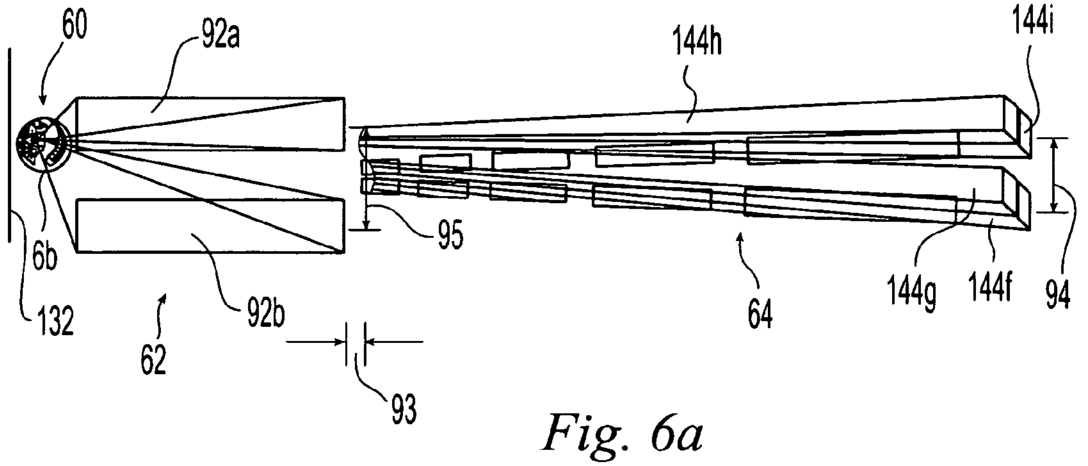
FIG. 6*a* is an overhead view of the infrared detecting apparatus of FIG. 3*a* monitoring two separate zones within a room.

Throughslot 80 may be oriented horizontal to floor 142, which has the advantage that the shape of near zone 62 where it meets floor 142, i.e., the "footprint" of near zone 62, is rectangular rather than trapezoidal. FIG. 6*a* best illustrates the rectangular shape of footprints 92*a*, 92*b*, which are formed by respective infrared-sensitive elements 78*a*, 78*b* imaging through throughslot 80. FIG. 6*b* is an enlarged overhead view of apparatus 60.

A distance 93 between one of footprints 92*a*, 92*b* of near zone 62 and a closest footprint of far zone 64 may be less than 12 inches. Thus, near zone 62 and far zone 64 may form a "curtain" extending across the room that is difficult for an intruder to pass through undetected.

The rectangular shape of footprints 92*a*, 92*b* may be advantageous in maintaining a fixed distance between footprints 92*a*, 92*b*, which may be beneficial for a couple of reasons. First, circuit 66 may be optimized for a one second period in the signals output by infrared-sensitive elements 78*a*, 78*b*. A speed of approximately 30 inches per second may be used to represent the speed of an intruder passing through a room. Thus, the optimal spacing between the areas imaged by infrared-sensitive elements 78*a*, 78*b*, i.e., between the adjacent footprints, may be approximately 30 inches such that an intruder may pass from one footprint to an adjacent footprint in about one second and thereby produce a one second period between the output signals of infrared-sensitive elements 78*a*, 78*b*. For a fixed focal length system, such as a fresnel array, this spacing may be impossible to achieve because the areas imaged are reduced in size the closer they are to IR sensor 72. This can be seen in FIG. 6*a* wherein a distance 94 between the midpoints of subzones

144*g* and 144*h*, and between the midpoints of subzones 144*f* and 144*i*, may be approximately between 20 inches and 50 inches, such as about 30 inches, but the trapezoidal footprints of the subzones converge as they approach IR sensor 72. Throughslot 80 does not have this convergence problem, however, as the focal length of throughslot 80 effectively changes with distance from infrared-sensitive elements 78*a*, 78*b*. As can be seen in FIG. 6*a*, a distance 95 between the midpoints of rectangular footprints 92*a*, 92*b* remains constant along the length of the footprints and thus may be set to a desired value, such as 30 inches. Thus, a one second period between the output signals of elements 78*a*, 78*b* may be achieved in the case of an intruder moving at an expected speed, such as 30 inches per second.

Figure 7A:
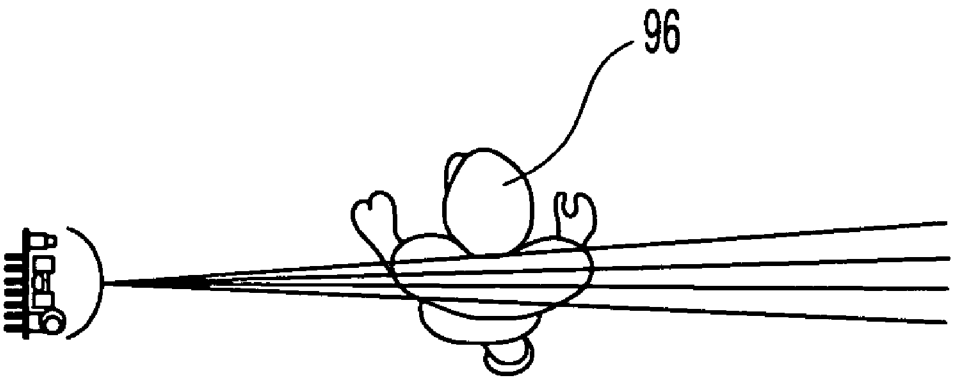
Fig. 7a (Prior Art)
FIG. 7*a* is an overhead view of an intruder in position to be sensed simultaneously by two separate infrared-sensitive elements according to the prior art.
Figure 7B:
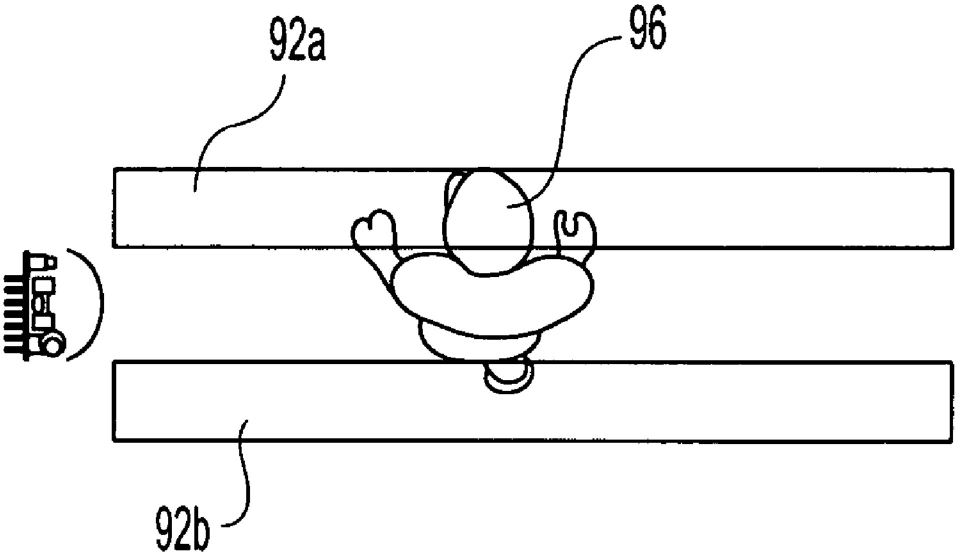
FIG. 7*b* is an overhead view of an intruder in position to be sensed by only one of two separate infrared-sensitive elements of the infrared detecting apparatus of the present invention.

A second reason that the fixed distance between footprints 92*a*, 92*b* may be advantageous is that it may increase the probability that an intruder is sensed by only one of infrared-sensitive elements 78*a*, 78*b* at a time. As shown in FIG. 7*a*, in the case of converging footprints or imaging zones of the prior art, an intruder 96 who is relatively close to the IR sensor may easily be disposed within both imaging zones at the same time. Because elements 78*a*, 78*b* are oppositely polarized and there is thus no change in the sum of the outputs of elements 78*a*, 78*b* when the intruder is in both imaging zones, the presence of the intruder may be wrongly interpreted as an increase in room temperature. This condition is sometimes referred to as "common mode". However, when a proper distance is maintained between adjacent imaging zones, as is the case with parallel, rectangular footprints 92*a*, 92*b* shown in FIG. 7*b*, an intruder 96 is likely to be disposed in only one of footprints 92*a*, 92*b*. In FIG. 7*b*, intruder 96 is predominantly in footprint 92*a* and predominantly out of footprint 92*b*. Thus, intruder 96 will more likely be correctly interpreted by apparatus 60 as a human. Further, the spacing between footprints 92*a*, 92*b* is small enough that an intruder 96 would not likely be able to walk between footprints 92*a*, 92*b* and thus escape detection.

Figure 8:
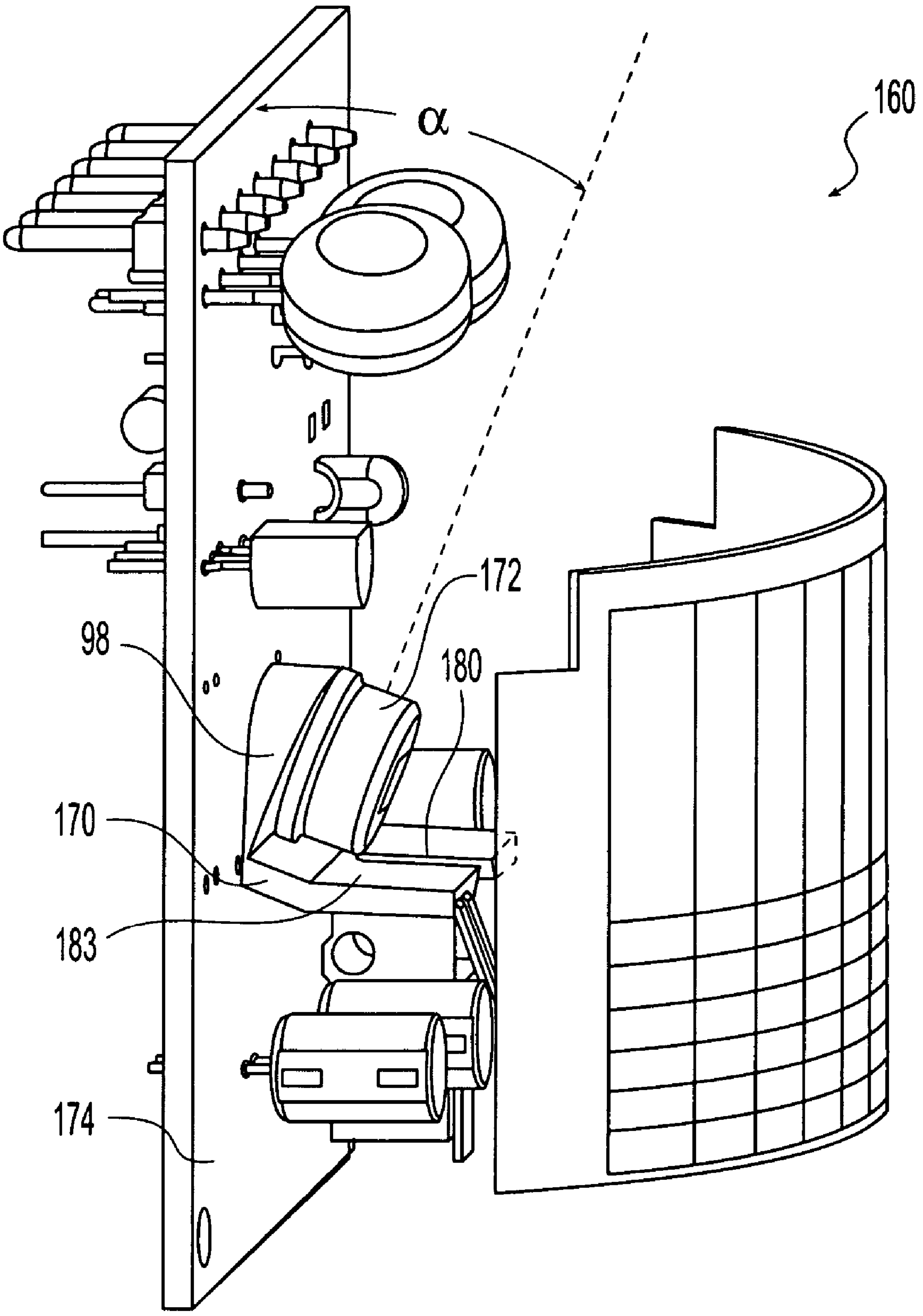
FIG. 8 is a perspective view of another embodiment of an infrared detecting apparatus of the present invention.

In another embodiment (FIG. 8), an IR detecting apparatus 160 includes an opaque element 170 having a slot lens 183 and a unitary sensor mount 98 for holding or mounting an IR sensor 172 at an angle a relative to a substantially vertically oriented circuit board 174. In one embodiment, angle $\alpha$ is approximately between 20° and 30°. Slot lens 183 includes an open-ended throughslot 180. Opaque element 170 may be unitarily molded or cast as a single piece of plastic or metal, for example. Such a one-piece slot lens and sensor mount has the advantage of facilitating the positioning of the opaque element relative to the IR sensor. That is, setting the relative positions of opaque element 170 and IR sensor 172 may be easier with the use of mount 98 to guide the positioning of IR sensor 172. Other aspects of apparatus 160 may be substantially similar to those of apparatus 60, and thus are not described further herein.

Figure 9:
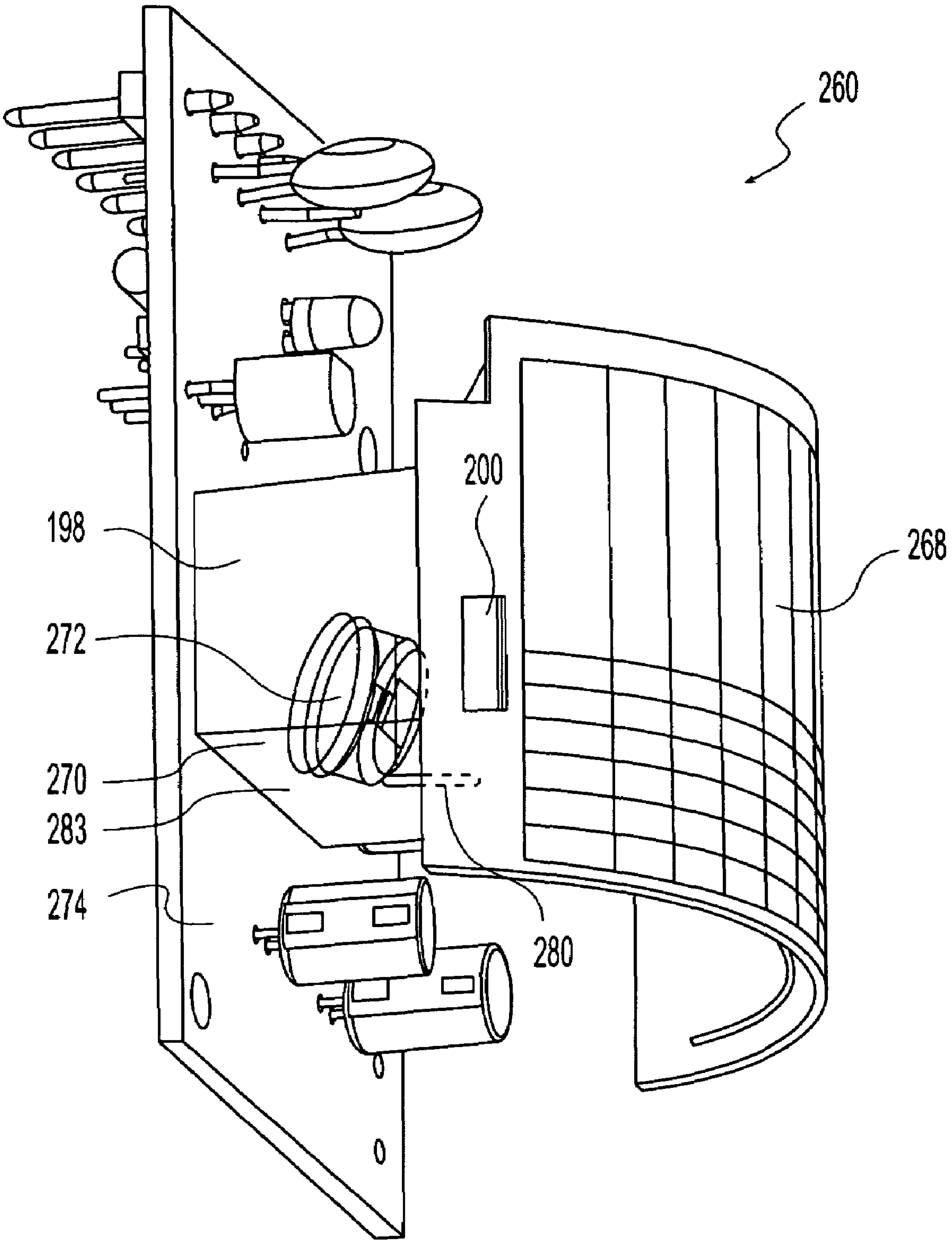
FIG. 9 is a perspective view of yet another embodiment of an infrared detecting apparatus of the present invention.

In yet another embodiment (FIG. 9), an IR detecting apparatus 260 includes an opaque element 270 in the form of a fresnel lens array holder 198 for holding a fresnel lens array 268 in place relative to a circuit board 274 and relative to an IR sensor 272. Fresnel lens array 268 has at least one opening 200 via which holder 198 and array 268 may be latched together. A bottom wall of holder 198 is in the form of a slot lens 283 having a throughslot 280. Other aspects of apparatus 260 may be substantially similar to those of apparatus 60, and thus are not described further herein.

Figure 10:
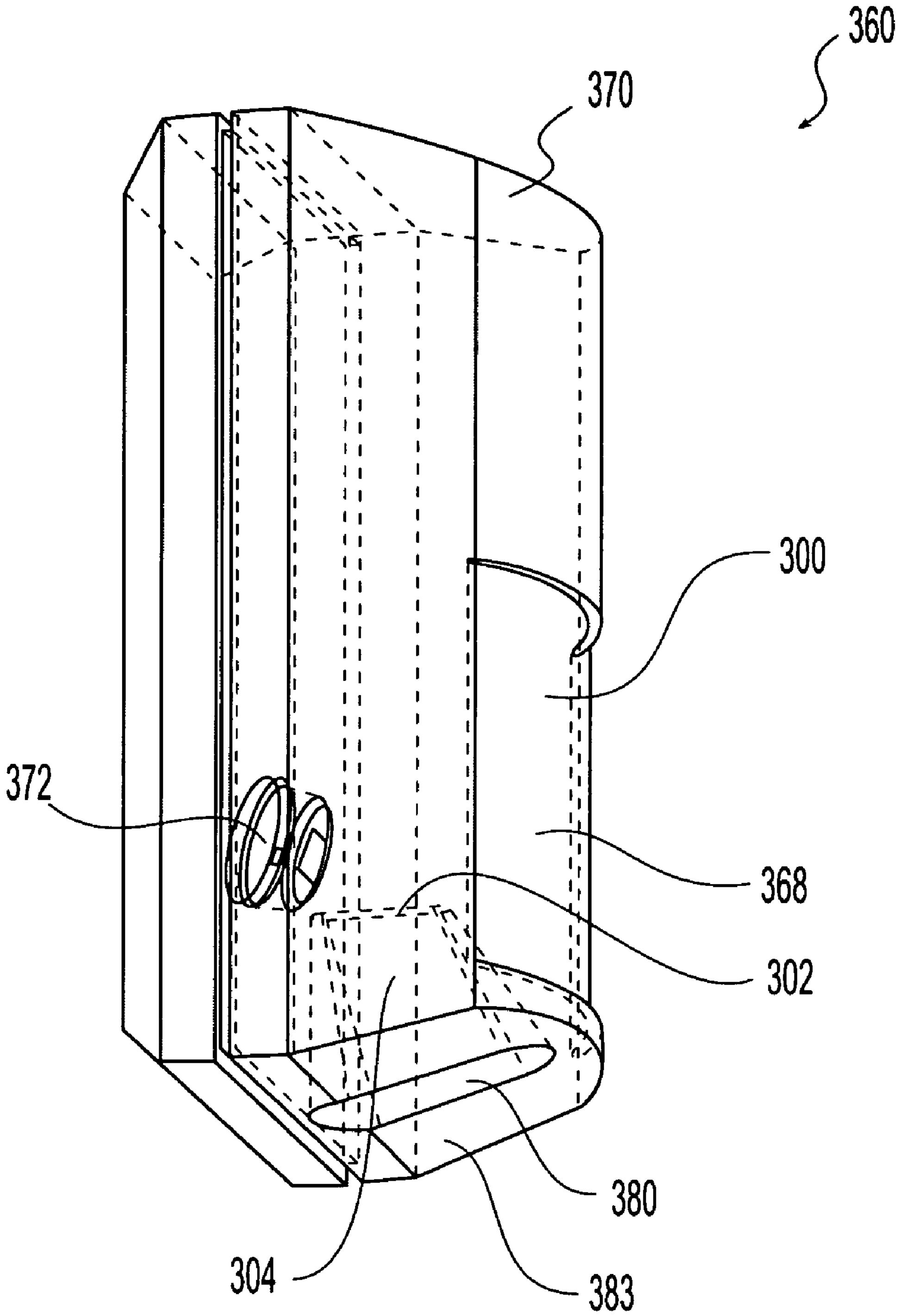
FIG. 10 is a perspective view of a further embodiment of an infrared detecting apparatus of the present invention.

In a further embodiment (FIG. 10), an IR detecting apparatus 360 includes an opaque enclosure 370 for an IR sensor 372 including at least one infrared-sensitive element. Enclosure 370 includes an opening 300 for a fresnel lens array 368. A bottom wall of enclosure 370 includes an infrared energy conduit 383 having a throughslot 380. Conduit 383 may be unitarily formed with enclosure 370. Conduit 383 has an elongate channel 304 with a height that may be greater than 0.25 inch in the vertical direction. An upper end 302 of channel 304 may be oriented parallel to the floor when enclosure 370 is mounted on a vertical circuit board or wall. Upper end 302 may have a width of approximately between 0.03 inch and 0.12 inch. Other aspects of apparatus 360 may be substantially similar to those of apparatus 60, and thus are not described further herein.

In a still further embodiment (FIGS. 11*a* and 11*b*), an opaque element 470 is in the form of a substrate 483 having a circular throughhole or pinhole 480. The vertical distortion of an image sensed through pinhole 480 may be less than the vertical distortion of an image sensed through a throughslot such as throughslot 80. However, the relatively low level of infrared energy that may pass through pinhole 480 limits the range of an infrared detecting apparatus employing opaque element 470. Thus, opaque element 470 may be advantageous for use in applications where range should be limited, such as a proximity detector for a keypad that is to detect a person within a three foot radius of the unit, but ignore a person disposed beyond the three foot radius. Other aspects of an apparatus utilizing opaque element 470 may be substantially similar to those of apparatus 60, and thus are not described further herein.

An infrared detecting apparatus has been described herein as including an opaque element separate from the IR sensor. However, it is to be understood that it may also be possible to form the opaque element as part of the IR sensor. For example, the opaque element may be in the form of a mask having a slot wherein the mask may be applied to a transparent lens of the IR sensor. Alternatively, a horizontally oriented slot lens may be unitarily formed with the IR sensor. In this case, there would be no need to position the IR sensor relative to the slot lens during assembly.

Although not explicitly disclosed above, it is to be understood that an infrared sensor used in the infrared detecting apparatus of the present invention may be disposed in an air-tight enclosure in order to protect the infrared sensor from the outside environment. An infrared sensor may be susceptible to false alarms if the enclosure has any opening to the ambient environment, as is well known. Thus, the infrared detecting apparatus of the present invention may include a polyethylene window that is transparent to infrared energy so as to allow infrared energy to reach the infrared-sensitive element through the throughhole or throughslot of the opaque element. The polyethylene window may be white or grey-colored, for example. The polyethylene window may be included in a bottom wall of an overall enclosure that encloses an IR detecting apparatus, such as apparatus 60 (FIG. 3*b*). Enclosure 370 (FIG. 10) may include a polyethylene window that covers throughslot 380, that covers upper end 302 of channel 304, or that is disposed within channel 304 somewhere between throughslot 380 and upper end 302.

While this invention has been described as having an exemplary design, the present invention may be further modified within the spirit and scope of this disclosure. This application is therefore intended to cover any variations, uses, or adaptations of the invention using its general principles.

What is claimed is:

1. An infrared detecting apparatus, comprising:

at least one infrared-sensitive element;

a fresnel lens array for focusing infrared energy from a first zone onto said at least one infrared-sensitive element; and an opaque element including a throughhole, said opaque element being positioned such that infrared energy may pass through said throughhole from a second zone to said at least one infrared-sensitive element, the second zone being closer than the first zone to said at least one infrared-sensitive element.

2. The infrared detecting apparatus of claim 1 wherein said at least one infrared-sensitive element comprises at least a first element and a second element, said first element and said second element being oppositely polarized.

3. The infrared detecting apparatus of claim 2 wherein the second zone comprises at least a first subzone and a second subzone, each of the subzones having a respective footprint with a respective midpoint, a distance between adjacent ones of the midpoints being approximately between 20 inches and 50 inches.

4. The infrared detecting apparatus of claim 1 wherein the first zone extends farther than the second zone from said at least one infrared-sensitive element.

5. The infrared detecting apparatus of claim 1 wherein said opaque element comprises a substrate.

6. The infrared detecting apparatus of claim 1 wherein said opaque element comprises an enclosure for said at least one infrared-sensitive element.

7. The infrared detecting apparatus of claim 1 wherein said throughhole comprises a throughslot.

8. An infrared detecting apparatus, comprising:

at least one infrared-sensitive element;

means for focusing infrared energy from a first zone onto said at least one infrared-sensitive element; and an opaque element including a throughslot having a length approximately between 0.25 inch and 3.0 inches, said opaque element being positioned such that infrared energy may pass through said throughslot from a second zone to said at least one infrared-sensitive element, the second zone being closer than the first zone to said at least one infrared-sensitive element.

9. The infrared detecting apparatus of claim 8 wherein said focusing means comprises a fresnel lens array.

10. An infrared detecting apparatus, comprising:

at least one infrared-sensitive element;

means for focusing infrared energy from a first zone onto said at least one infrared-sensitive element; and an opaque element including a throughhole having a width approximately between 0.03 inch and 0.12 inch, said opaque element being positioned such that infrared energy may pass through said from a second zone to said at least one infrared-sensitive element, the second zone being closer than the first zone to said at least one infrared-sensitive element.

11. The infrared detecting apparatus of claim 10 wherein said focusing means comprises a fresnel lens array.

12. An infrared detecting apparatus, comprising:

at least one infrared-sensitive element;

means for focusing infrared energy from a first zone onto said at least one infrared-sensitive element; and an opaque element including a throughhole, said opaque element being positioned such that infrared energy may pass through said throughhole from a second zone to said at least one infrared-sensitive element, the second zone closer than the first zone to said at least one infrared-sensitive element, wherein a distance between a footprint of the first zone and a footprint of the second zone is less than 12 inches.

13. The infrared detecting apparatus of claim 12 wherein said focusing means comprises a fresnel lens array.

14. An infrared detecting apparatus, comprising:

at least one infrared-sensitive element;

a fresnel lens array positioned to focus infrared energy from a first zone onto said at least one infrared-sensitive element; and an infrared energy conduit configured to carry infrared energy from a second zone to said at least one infrared-sensitive element, the infrared energy conduit including an elongate channel having a length approximately between 0.25 inch and 3.0 inches, the first zone extending farther than the second zone from said at least one infrared-sensitive element.

15. The infrared detecting apparatus of claim 14 wherein said at least one infrared-sensitive element comprises at least a first element and a second element, said first element and said second element being oppositely polarized.

16. The infrared detecting apparatus of claim 15 wherein the second zone comprises at least a first subzone and a second subzone, each of the subzones having a respective footprint with a respective midpoint, a distance between adjacent ones of the midpoints being approximately between 20 inches and 50 inches.

17. The infrared detecting apparatus of claim 14 wherein the first zone extends farther than the second zone from said at least one infrared-sensitive element.

18. The infrared detecting apparatus of claim 14 wherein said infrared energy conduit comprises a substrate having a throughhole.

19. The infrared detecting apparatus of claim 14 wherein said infrared energy conduit is formed unitarily with an enclosure for said at least one infrared-sensitive element.

20. The infrared detecting apparatus of claim 14 wherein said infrared energy conduit has a channel with a width approximately between 0.03 inch and 0.12 inch.

21. The infrared detecting apparatus of claim 14 wherein a distance between a footprint of the first zone and a footprint of the second zone is less than 12 inches.

22. An infrared detecting apparatus, comprising:

at least one infrared-sensitive element;

a fresnel lens array positioned to focus infrared energy from a first zone onto said at least one infrared-sensitive element; and an opaque element including a defining a longitudinal direction, said opaque element being positioned such that infrared energy may pass through said throughslot from a second zone to said at least one infrared-sensitive element, the first zone extending farther than the second zone from said at least one infrared-sensitive element in the longitudinal direction, wherein the second zone comprises at least a first subzone and a second subzone, each of the subzones having a respective footprint with a respective midpoint, a distance between adjacent ones of the midpoints being approximately between 20 inches and 50 inches.

23. The infrared detecting apparatus of claim 22 wherein said at least one infrared-sensitive element comprises at least a first element and a second element, said first element and said second element being oppositely polarized.

24. The infrared detecting apparatus of claim 22 wherein the first zone extends farther than the second zone from said at least one infrared-sensitive element.

25. The infrared detecting apparatus of claim 22 wherein said opaque element comprises a substrate.

26. The infrared detecting apparatus of claim 22 wherein said opaque element comprises an enclosure for said at least one infrared-sensitive element.

27. The infrared detecting apparatus of claim 22 wherein said throughslot has a length approximately between 0.25 inch and 3.0 inches.

28. The infrared detecting apparatus of claim 22 wherein said throughslot has a width approximately between 0.03 inch and 0.12 inch.

29. The infrared detecting apparatus of claim 22 wherein a distance between a footprint of the first zone and a footprint of the second zone is less than 12 inches.

30. An infrared detecting apparatus comprising:

a support;

an opaque element coupled to the support, the opaque element including a sensor mount and a throughhole;

at least one infrared-sensitive element coupled to the sensor mount; and means for focusing infrared energy from a first zone onto said at least one infrared-sensitive element, the opaque element being positioned relative to the sensor mount such that infrared energy may pass through said throughhole from a second zone to said at least one infrared-sensitive element, the second zone being closer than the first zone to said at least one infrared-sensitive element.

31. The apparatus of claim 30, wherein the support has a generally planar, vertically extending support surface, and the at least one infrared-sensitive element coupled to the sensor mount is downwardly tilted at an angle θ relative to the vertically extending support surface.

32. The apparatus of claim 31, wherein the angle θ is approximately between 20° and 30°.

33. The apparatus of claim 31, opaque element includes a generally planar portion extending generally horizontally away from the vertically extending support surface below the at least one infrared-sensitive element.

34. The apparatus of claim 30, wherein said focusing means comprises a fresnel lens array.

35. The apparatus of claim 34, wherein the opaque element includes a fresnel lens array holder configured to hold the fresnel lens array in place relative to the support and the at least one infrared-sensitive element, the fresnel lens array holder including a bottom wall formed to include the throughhole of the opaque element.

36. The apparatus of claim 30, wherein the support is a printed circuit board including a plurality of electronic components mounted thereon adjacent the at least one infrared-sensitive element.

37. The apparatus of claim 30, wherein the opaque element is integrally formed with the sensor mount, the sensor mount facilitating positioning of the opaque element relative to the at least one infrared-sensitive element.

38. The apparatus of claim 30, wherein the sensor mount holds the at least one infrared-sensitive element at a non-perpendicular angle relative to a portion of the opaque element which is configured to define the throughhole.

39. The apparatus of claim 30, wherein the throughhole is an elongated throughslot having a length approximately between 0.25 inch and 3.0 inches and a width approximately between 0.03 inch and 0.12 inch.

40. The apparatus of claim 30, wherein the opaque element is formed integrally with the at least one infrared-sensitive element.

* * * * *